Aug. 15, 1972   M. ROBERTS   3,684,582
ELECTRIC STORAGE BATTERIES
Filed Aug. 25, 1970   3 Sheets-Sheet 1
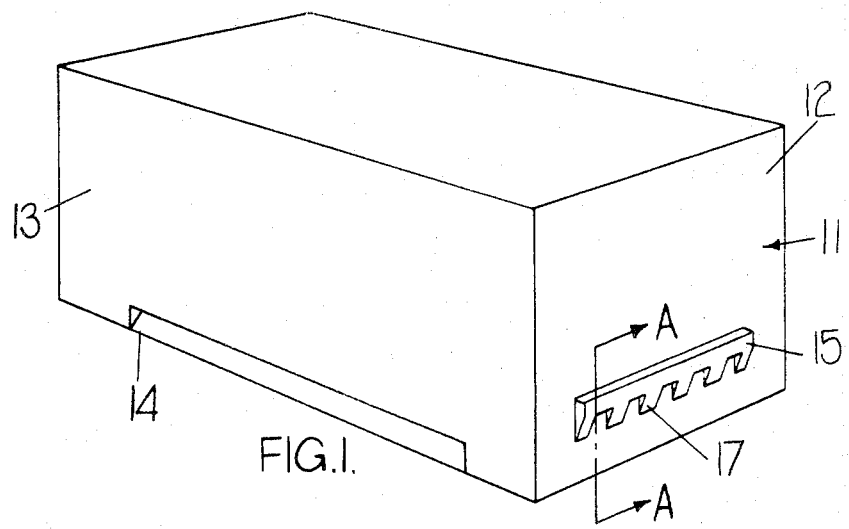
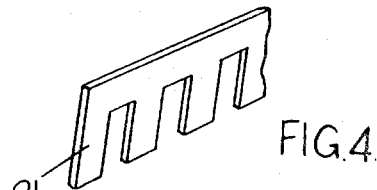
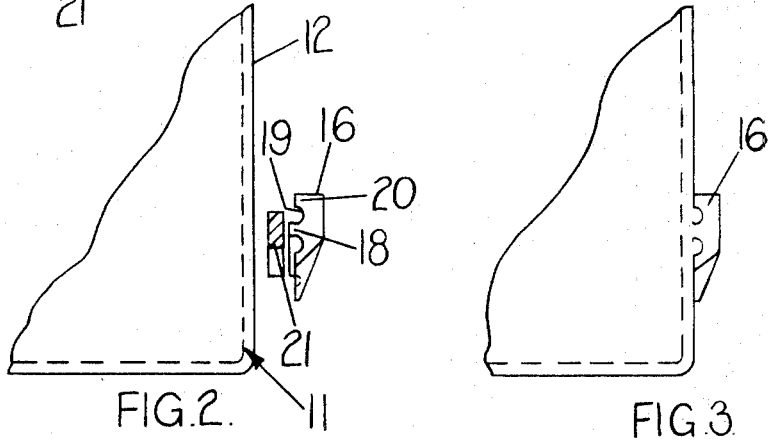
INVENTOR
Maurice Roberts
Holman & Stern
ATTORNEYS Aug. 15, 1972    M. ROBERTS    3,684,582
ELECTRIC STORAGE BATTERIES
Filed Aug. 25, 1970    3 Sheets-Sheet 2
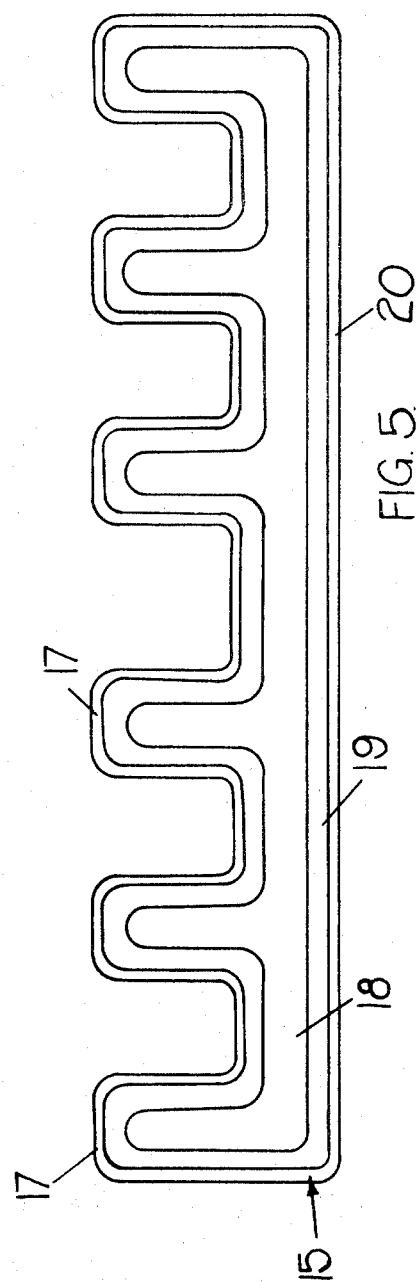
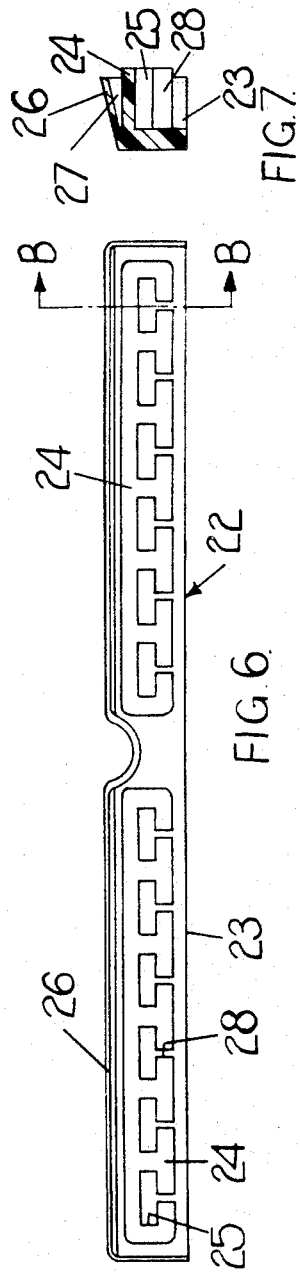
INVENTOR
Maurice Roberts
ATTORNEYS Aug. 15, 1972    M. ROBERTS    3,684,582
ELECTRIC STORAGE BATTERIES Filed Aug. 25, 1970    3 Sheets-Sheet 3

INVENTOR
Maurice Roberts
Holman & Stern
ATTORNEYS

United States Patent Office 3,684,582
Patented Aug. 15, 1972

3,684,582
ELECTRIC STORAGE BATTERIES
Maurice Roberts, 73 Fentham Road, Hampton-in-Arden, Warwickshire, England
Filed Aug. 25, 1970, Ser. No. 66,700
Int. Cl. H01m 1/04
U.S. Cl. 136—166                 4 Claims

ABSTRACT OF THE DISCLOSURE

A method of providing mounting means and/or lifting means on the external wall of a battery box comprises starting with a moulded mounting or lifting member which is formed with a peripheral skirt extending from the surface thereof to be presented to the battery box and with an integral projection defined within the skirt and extending therefrom, the skirt and the projection defining a channel therebetween. A heater is placed between the projection and a portion of an external wall of the battery box from which the mounting or lifting member is required to protrude and said portion of the battery box and the projection are urged into contact with the heater. The heater is then withdrawn and the mounting or lifting member and said portion of the battery box are pressed into engagement with one another to secure the member to the battery box with the skirt abutting against the external wall of the battery box. Molten material displaced from the projection during the heating step is received in the channel.

---

This invention relates to electric storage batteries in which the battery box is moulded from a thermoplastic synthetic resin and includes mounting means and/or lifting means protruding from the external walls thereof so that the battery can be secured in position on and/or lifted from position on a road vehicle.

Accordingly, the invention resides in a method of providing mounting means and/or lifting means on the external wall of a battery box comprising starting with a moulded mounting or lifting member formed with a peripheral skirt extending from the surface thereof to be presented to the battery box and an integral projection defined within said skirt and extending therefrom, said skirt and said projection defining a channel therebetween, and effecting the steps of placing a heater between said projection and a portion of an external wall of the battery box from which said mounting or lifting member is required to protrude, urging said portion of the battery box and said projection into contact with the heater, withdrawing the heater and pressing said mounting or lifting member and said portion of the battery box into engagement with one another to secure said member to the battery box with said skirt abutting against said external wall of the battery box, molten material displaced from said projection during the heating step being received in said channel.

By virtue of the method described above the appearance is given in the finished battery that the mounting or lifting member has been moulded integrally with the battery box. Further the method overcomes the disadvantages of actually moulding these mounting and/or lifting means integral with the battery box since such moulding techniques require the use of complicated mould forms and so suffer from difficulties in removing the finished article from the moulds.

Figure 8:
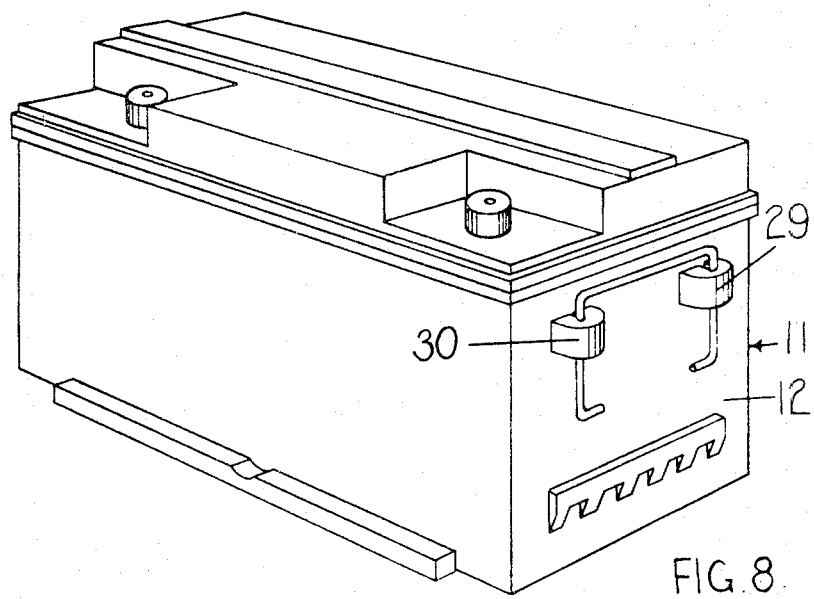
Figure 9:
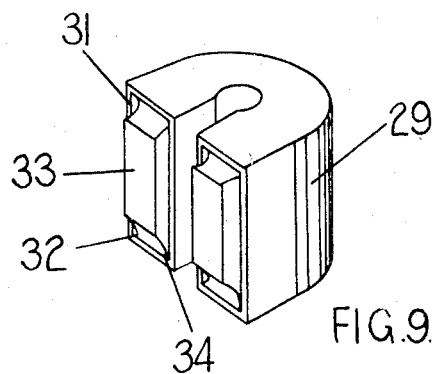

In the accompanying drawings:

FIG. 1 is a perspective view of a battery box with mounting means secured thereto by a method according to one example of the invention, FIGS. 2 and 3 are sectional views along the line A—A in FIG. 1 showing two stages during the manufacture of the box shown in FIG. 1, FIG. 4 is a perspective view of the heater shown in FIG. 2, FIG. 5 is an inverted plan view to an enlarged scale of the mounting means shown in FIG. 1, FIG. 6 is an inverted plan view of mounting means for securing to an alternative form of battery box to that shown in FIG. 1, and, FIG. 7 is a sectional view along the line B—B in FIG. 6, FIG. 8 is a perspective view similar to FIG. 1, showing a battery box with mounting means and lifting means secured thereto, and FIG. 9 is a perspective view to an enlarged scale of part of the lifting means shown in FIG. 8.

Referring to FIGS. 1 to 5, an electric storage battery includes a thin-walled synthetic resin battery box 11, conveniently formed from polypropylene, the box being divided by internal walls into cells each of which contains an assembly of plates and separators. Connections between adjacent cells are made through the internal walls, and plates in the end cells are connected to terminal posts extending through a lid secured to the battery box.

The battery box includes end walls 12 and side walls 13 which are longer than the end walls 12. Moulded integrally into the walls 13 are a pair of recesses 14 respectively each of which presents a downwardly inclined surface, the arrangement being such that in use the battery box can be held in position by a pair of clamps acting on the downwardly inclined surfaces. For many applications, however, it is unsatisfactory to hold the box in position in this way, and to overcome this problem a pair of flanges 15 are secured to the end wall of the battery. Each flange 15 also presents a downwardly inclined surface for engagement by a suitable clamping member.

Each of the flanges is in the form of an elongated member, the outer surface 16 of which is downwardly inclined when the flange is secured to the wall 12, and the lower surface of which is in the form of a plurality of fingers 17 which are secured to the wall 12. On the side of the flange presented to the wall 12, there is provided an outwardly extending projection 18 around which is defined an annular channel 19 and a peripheral skirt 20. The projection 18 extends above the skirt 20 and in order to interconnect the parts, the wall 12 and the projection 18 are pressed into engagement with a heater 21, shaped complementarily with the projection 18 which is then withdrawn after which the parts are pressed firmly into engagement with one another, so that the skirt 20 abuts against the wall 12. The projection 18 melts and the molten material is received in the channel 19 so as to give the battery box 11 with the flange 15 secured thereto a well finished appearance such as if the flange had been moulded integrally with the battery box. Typically, the parts are in contact with the heater for ten seconds, after which they are pressed into engagement with one another for ten seconds at a pressure of thirty-four pounds per square inch. The flanges 15 can be secured to the box simultaneously.

In FIG. 6 there is shown an alternative form of mounting member to that described above and which is for use with a battery box (not shown) in which the recesses 14 in the side walls 13 respectively are omitted. This alternative form of mounting member comprises a moulded strip 22 the outer surface and lower edge 23 of which are flat, one strip being secured to each side wall 13 of the box in the same position as that occupied by a recess 14 in the above example and with the flat edge 23 of the strip 22 in line with the bottom of the battery box. On the side of the strip 22 presented to the battery box there is provided a pair of upstanding portions 24 which extend from the outside edges respectively of the strip towards the center. A plurality of recesses 25 are formed in each of the upstanding portions 24 and a skirt 26 extends around the periphery of the strip 22 on said one side thereof and between the ends of the edge 23 of the strip. Further a channel 27 is defined between the portions 24 and the skirt 26, the portions 24 extending above the skirt 26 so that the strip 22 is secured to the battery box in a similar manner to that described above with the upstanding portions 24 melting and filling up the channel 27 to provide the battery box with the strip secured thereto with a moulded appearance. The recesses 25 are provided in the portions 24 to facilitate moulding of the strip 27 with its outer edge flat and preferably a plurality of apertures 28 are formed in each of the upstanding portions 24, each of the apertures 28 extending into a recess 25 so as to allow air trapped in the recesses to escape when the upstanding portions 24 melts during the joining operation.

It is to be appreciated that the flanges 15 as well as the moulded strips 22 may be secured to a battery box. Further in some cases the flanges 15 without the recesses 14 may provide the sole mounting means, or alternatively just the moulded strips 22 may be used. Also the dimensions of the mounting members defined by the strips and the flanges may be varied so as to cater for mounting different battery boxes in different vehicles.

Referring to FIGS. 8 and 9, a battery box 11 is to be provided with means for lifting the battery from position on a road vehicle as well as means for mounting the battery in position on the road vehicle. In the example shown the lifting means is provided on each end wall 12 of the battery box and comprises a pair of substantially U-shaped members 29 each of which is adapted to receive between its respective limbs one end of a handle member 30. Each of the members 29 is secured to the battery box 11 at the free end surface 31 of each of its respective limbs, the surfaces 31 each including an integral peripheral skirt 32 extending therefrom and an integral projection 33 bounded by the skirt 32. The projection 33 extends above the plane of the skirt 32 and defines with the skirt 32 a channel 34. The members 29 are secured to the end walls 12 in the manner described above, molten material from the projections 33 being received in the channels 34 so as to give the appearance of the members 29 having been moulded integrally with the battery box 11. It is to be appreciated that other forms of lifting means could be secured to a battery box by the method of the invention including a single moulding to accommodate both limbs of the handle member, or a moulding in which the handle member is moulded integrally with the portions to be joined to the battery box.

Further it is to be appreciated that for the finished battery box to have the required moulded appearance with the lifting and/or mounting means strongly welded thereto the surfaces of the heater which engage the battery box and the projections extending from the surface of the lifting or mounting member presented to the battery box, are shaped complementarily with said projection.

Having thus described my invention what I claim as new and desire to secure by Letters Patent is:

1. A method of manufacturing an electric storage battery comprising the steps of starting with a moulded, thermoplastic battery box, moulding in a thermoplastic material an auxiliary member for performing one of the functions of lifting means and mounting means for the battery, the auxiliary member being formed with a peripheral skirt extending from the surface thereof to be presented to the battery box and with an integral projection defined within said skirt and extending therefrom, placing a heater between said projection and a flat portion of the surface of an external wall of the battery box from which said auxiliary member is required to protrude, urging said flat portion of the battery box and said projection into contact with the heater, withdrawing the heater and pressing said auxiliary member and said portion of the battery box into engagement with one another to secure said member to the battery box with said skirt abutting against said external walls of the battery box, molten material displaced from said projection during the heating step being received in said channel.

2. A method as claimed in claim 1 wherein the surfaces of said heater which engage said flat portion of the battery box and said projection respectively are shaped complementarily with the projection.

3. A method as claimed in claim 1 wherein said projection is provided with a plurality of recesses so as to facilitate moulding of the auxiliary member to the required shape.

4. A method as claimed in claim 3 wherein means is provided for venting said recesses to the atmosphere when said auxiliary member is being pressed into engagement with said battery box so as to allow air trapped in the recesses to escape therefrom as the projection melts during the heating step.

References Cited

UNITED STATES PATENTS

| 3,276,941 | 10/1966 | Burns | 264—248 |
| 3,093,515 | 6/1963 | Rector | 136—166 |

DONALD L. WALTON, Primary Examiner

U.S. Cl. X.R.

136—176; 156—306; 264—248

UNITED STATES PATENT OFFICE
CERTIFICATE OF CORRECTION

Patent No. 3,684,582      Dated August 15, 1972

Inventor(s) Maurice Roberts

It is certified that error appears in the above-identified patent and that said Letters Patent are hereby corrected as shown below:

After "England" insert --Assignee: Joseph Lucas (Industries) Limited, Birmingham, England--

Signed and sealed this 5th day of November 1974.

(SEAL)
Attest:

McCOY M. GIBSON JR.
Attesting Officer

C. MARSHALL DANN
Commissioner of Patents